(12) United States Patent
Farrugia et al.

(10) Patent No.: US 8,380,991 B2
(45) Date of Patent: Feb. 19, 2013

(54) HASH FUNCTION BASED ON POLYMORPHIC CODE

(75) Inventors: Augustin J. Farrugia, Cupertino, CA (US); Mathieu Ciet, Paris (FR); Benoit Chevallier-Mames, Paris (FR)

(73) Assignee: Apple Inc., Cupertino, CA (US)

( * ) Notice: Subject to any disclaimer, the term of this patent is extended or adjusted under 35 U.S.C. 154(b) by 597 days.

(21) Appl. No.: 12/433,757

(22) Filed: Apr. 30, 2009

(65) Prior Publication Data

US 2010/0281260 A1    Nov. 4, 2010

(51) Int. Cl.
*H04L 29/06* (2006.01)

(52) U.S. Cl. ........ 713/170; 713/161; 713/167; 713/168; 713/169; 713/181

(58) Field of Classification Search .................. None
See application file for complete search history.

(56) References Cited

U.S. PATENT DOCUMENTS

| | | | |
|---|---|---|---|
| 2002/0023209 A1* | 2/2002 | Domstedt et al. | 713/160 |
| 2007/0028088 A1* | 2/2007 | Bayrak et al. | 713/150 |
| 2010/0034385 A1* | 2/2010 | Gantman et al. | 380/268 |
| 2010/0250966 A1* | 9/2010 | Olson et al. | 713/190 |

OTHER PUBLICATIONS

C. B. Roellgen, Scalable PMC Hash, 2007, PMC Ciphers, Inc, Josephsburgstr. 85, 81673 Munich, Germany All pages.*

* cited by examiner

*Primary Examiner* — Jung Kim
*Assistant Examiner* — Adrian Stoica
(74) *Attorney, Agent, or Firm* — Adeli & Tollen LLP (57) ABSTRACT

In the field of computer data security, a hash process which is typically keyless and embodied in a computing apparatus is highly secure in terms of being resistant to attack. The hash process uses computer code (software) polymorphism, wherein computation of the hash value for a given message is partly dependent on the content (data) of the message. Hence the computer code changes dynamically while computing each hash value.

18 Claims, 5 Drawing Sheets

| Name | Type | Comments |
|---|---|---|
| DataIns Vault | WORD* | A table containing a certian number of instruction/ data |
| TC | Table | The table of correspondance, ie a way to transform an opcode into an instruction to execute |
| DATA_INS_VAULT_SIZE | Integer | The size of the table DataIns Vault |
| SEC_PARAM | Integer | The number of execution of the polymorphism idea, for each block of message |
| index | Integer | The program counters, which varies between 0 and DATA_INS_VAULT_SIZE |
| i, j, k | Integer | counters in a loop |

| Value of DataIns Vault[index] | Index | j | Instruction to execute |
|---|---|---|---|
| 0 | 10 | 0 | Add DataIns Vault[0] and DataIns Vault[1] |
| 1 | 11 | 1 | XOR Add DataIns Vault[13] and DataIns Vault[11] |
| ... | ... | ... | ... |
| 2 | >11 | 2 | NewIndex = DataIns Vault[index+1] |
| | | | |
| | | | |
| | | | |
| | | | |
| | | | |
| | | | |
| | | | |
| | | | |
| | | | |
| | | | |
| | | | |
| | | | |
| | | | |

*Fig. 2*

| Name | Type | Comments |
|---|---|---|
| DataIns Vault | WORD* | A table containing a certian number of instruction/ data |
| TC | Table | The table of correspondance, ie a way to transform an opcode into an instruction to execute |
| DATA_INS_VAULT_SIZE | Integer | The size of the table DataIns Vault |
| SEC_PARAM | Integer | The number of execution of the polymorphism idea, for each block of message |
| index | Integer | The program counters, which varies between 0 and DATA_INS_VAULT_SIZE |
| i, j, k | Integer | counters in a loop |

HASH FUNCTION BASED ON POLYMORPHIC CODE

FIELD OF THE INVENTION

This disclosure relates to computers, computer data security, and to secure hash functions (hashing) and message authentication codes.

BACKGROUND

Hash functions are well known in the data security field. Some hash functions are keyed (such as message authentication codes—MAC), but most instead rely on the security of the hash function (algorithm) itself. Such algorithms are subject to various attacks, such as the well known "pairs" attack (differential analysis).

A hash function conventionally is a deterministic procedure that accepts an arbitrary input value, and returns a hash value of predetermined and fixed length. The input value is called the message, and the hash value is called the digest. Well known secure (cryptographic) hash functions include SHA-1, SHA-2 and others. Such hash functions are "second preimage resistant" in that given the message it is easy using a computer or equivalent to compute the digest, but given a particular message it is very difficult to find another message with the same digest. In the same manner, hash functions are designed to be one way, that is, it is complex to find a message whose digest is a given value. So the digest is a unique "fingerprint" of the message.

SUMMARY

The invention is directed towards a cryptographic hash function useful for verifying digital signatures or data integrity in various applications such as a digital signature, data integrity, and others. Many analyses of commonly used hash functions have been published recently so the field of hash functions now is of high interest. After the first such attacks were published, this led to the design of new hash functions. A standardization process has been started in the field to find hash functions of the future. Most of them are based on a conventional assembling of basic operations applied on data bytes of 32-bits.

All existing hash functions are designed as a set of operations, and the input (the message or data to be hashed) is only used as data. This disclosure instead is of a "disruptive" hashing approach, where a part of the process to compute the hash value (digest) is determined a priori, and where the remaining part is determined in a given way by the data inputs themselves.

The present solution has the advantage of avoiding an attacker collecting pairs of intermediate results for different messages since here the execution flow of the algorithm is linked to the message (input data) itself. It also has the advantage of being easily configurable, since the addition of operations is simple. One can also configure the complexity of the hash procedure according to the application where it is to be used. The present solution thus defines a family of hash functions.

The goal is to provide a new secure hash function that can be used and applied in various field of data security, to ensure the integrity of a digital document or digital signature for instance. Applications of hash functions are numerous in terms of data exchange, digital signatures, etc. The goal here is to provide a computer software program or logic for calculating the digest that auto-modifies itself at least in part according to the input data (message). Hence this uses the principle of polymorphic code. Polymorphic code (computer software) is known and is computer code that changes (or "mutates") while keeping the original algorithm (procedure) intact. It is often used in computer "malware" such as viruses and computer worms to hide their presence. However that is not the purpose here, where instead the goal is to provide a secure hash function.

While in the examples given here the hash function has no key, in one variant a key is used in the form, for instance, of the initial values in the storage table, described below.

DETAILED DISCLOSURE

The present hash process and associated system as embodied in computer software to be executed on a processor in a computing device have a data storage table called the DataInsVault of DATA_INS_VAULT_SIZE data words. Each entry (row) of the table, called DatazInsVault[i] for an index i, is seen as an instruction or a set of instructions (a computer code instruction) or as a computer data, depending on the context.

The system uses one or more computer code instruction sets. First, consider the set of such instructions without argument, e.g., SkipNextInstruction, which increments the computer program counter (index) by 2. Second, there is a set of instructions with one argument, e.g. IncrNextData, which takes data and increments it by 1. A third set of instructions has two arguments, e.g., Add, Subtract . . . , which take two words and adds or subtracts them. In fact, there are a very large number of instructions, with varying number of arguments. Each possible value of a word (called an opcode) thereby codes for (designates) a given instruction; two opcodes can correspond to the same instruction, which is useful if the number of instructions is limited, or if one wants to favor one instruction probability.

The storage table DataInsVault is used both to provide (store) instructions and to provide (store) data such as the message. The result of the execution of the program instructions thereby stored in table DataInsVault is also stored in the table, so that the program is in a way modifying itself (is polymorphic).

The present hash algorithm (process or procedure) operates as follows in one example. The storage table index i is initiated by value 0, and the storage table DataInsVault is initiated with an initial value INITIAL_VALUE. The message (or other data) to authentify using the hash function is introduced into the storage table, for example by logically XORing (exclusive OR) the message words into the table's last words (entries) or using some other binary operation such as subtract or multiply. During execution of the algorithm, the index i is considered modulo DATA_INS_VAULT_SIZE, which means that all access to the storage table DataInsVault is done by first computing a modulo DATA_INS_VAULT_SIZE.

Figure 1:
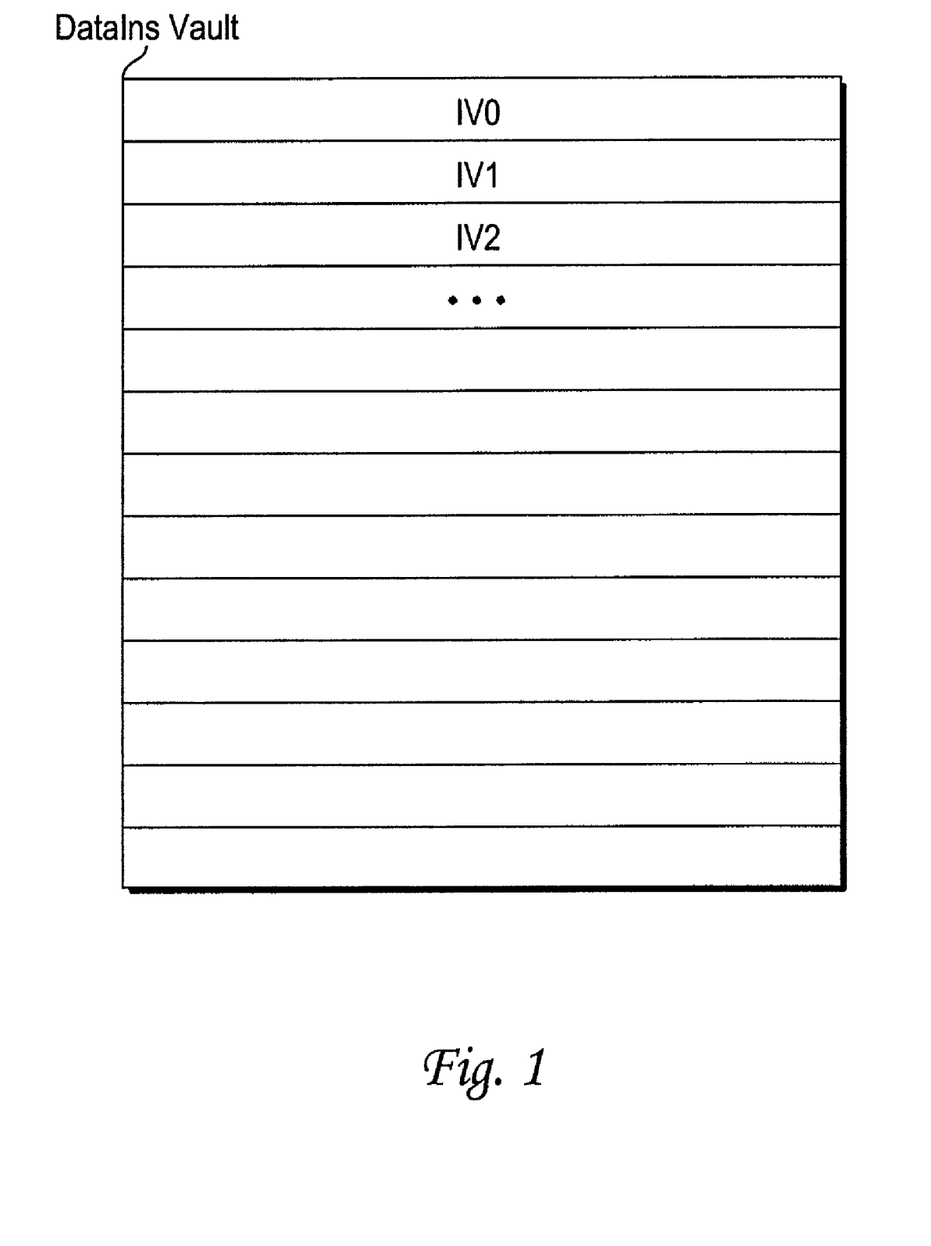
FIG. 1 shows a storage table.

FIG. 1 shows the structure of the storage table with its row elements (entries) designated IV0, IV1, IV2, etc., each having the index i and where "IV" stands for initial value. The first step in the process therefore is the construction of this storage table DataInsVault. Each entry thereby contains values IV_i, where i is the index (so the entries can be accessed as DataInsVault[i]).

Figure 2:
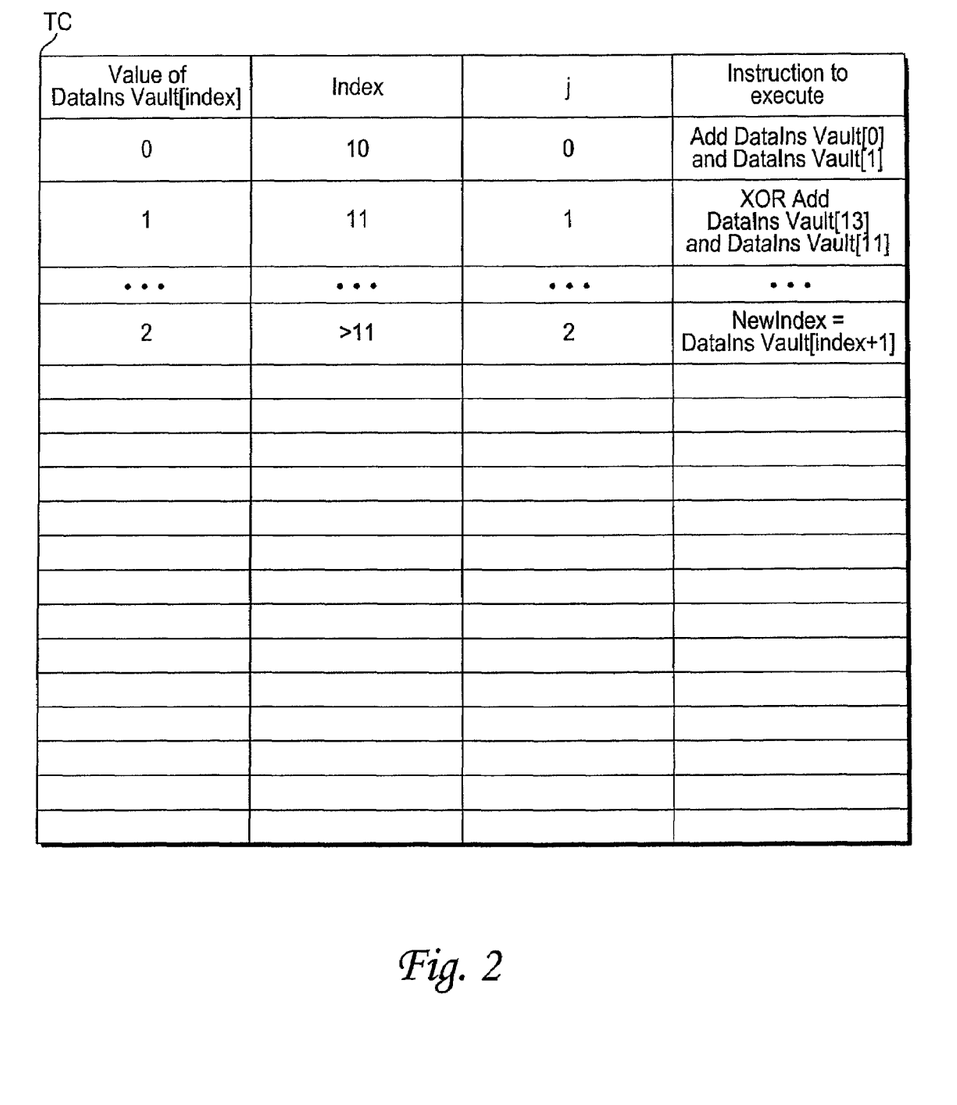
FIG. 2 shows a table of correspondence.

The next step is to construct a second table called a table of correspondence, designated TC. This second table TC is shown in FIG. 2, each entry (row) having four fields which as shown are (1) an index value DataInsVault[i] (relating to the storage table of FIG. 1), (2) the table of correspondence index, (3) a counter j, and (4) a computer code instruction to be executed to perform the hash function.

The polymorphic hash function is computed by the following process. The main property is that the storage table DataInsVault is polymorphic since it is first initialized (as above) and then modified all during the process of hashing. The hash function operates on a message M (conventionally provided in digital form) and which is conventionally partitioned into blocks M_i (for instance 512-bit long blocks), each block being given as a list of data words m_0, ... m_{n−1}. If the message is not a multiple of 512 bits in length, conventionally padding is added to extend it to the required length.

The process is as follows, expressed for ease of understanding in the form of computer pseudo-code:

```
Input:    message M = M_0, M_1, ... M_{1−1} decomposed
          into blocks (for instance 512-bit long blocks)
Output:   hash value (digest) h_0, ... h_{k−1} (h_i being a byte).
index = 0
/* Initialize the table with the initial value IV */
For k = 0 to (DATA_INS_VAULT_SIZE−1)
    DataInsVault[j] = IV_k
Endfor
/* Hash message block by block */
For i from 0 to l − 1
m = M_i = m_0, ... m_{n − 1} /* each
m_i being a word, for instance a byte */
/* Update DataInsVault with the current message block m; this
operation may be different, see below */
For k = 0 to (DATA_INS_VAULT_SIZE −1)
    DataInsVault[j] ^=m_{k modulo n}
Endfor
/* Use the polymorphism */
For j from 0 to (SEC_PARAM − 1)
    (newindex, DataInsVault[index]) = interp(index, DataInsVault, TC, j)
    index = newindex
Endfor
/* Extract the hash */
(h_0, ... h_{k−1}) = extract(DataInsVault);
```

In this pseudo-code, the comments conventionally are set off by the symbols /* and */. The operator "^" indicates the logical XOR operation. Variable SEC_PARAM is an undefined security parameter indicating the number of iterations of index j. This pseudo-code is equivalent to, for instance, a computer program coded in the C computer software language, but this is not limiting.

The interp( ) function takes as its input the storage table index i (the position where one is in the storage table DataInsVault), the storage table DataInsVault which is regularly updated when changing DataInsVault[index] at each step, the table of correspondence TC, and the current index of the execution counter j. Then the interp( ) function consults table TC to determine which instruction to execute, executes it, and updates the index value (where it is going to access in the storage table for the next step) and the value DataInsVault [index] in the storage table.

Figure 3:
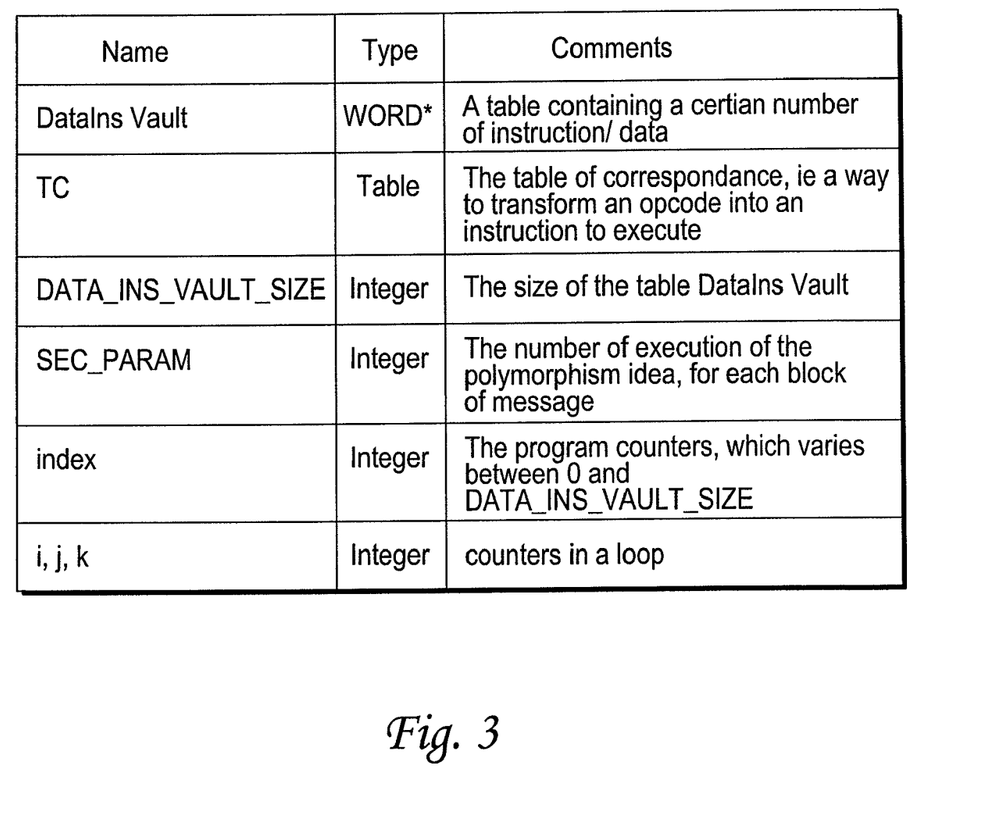
FIG. 3 shows a list of variables.

The table of correspondence TC determines a function f_{index, DataInsVault[index],j}. The parameters "{.}" parameters are used to express the fact that the instruction opcode depends both on DataInsVault[index] as expected, and also on the address of the opcodes (which is index i) and on the current moment of the execution j. The j counter parameter is optional and improves security by having instructions depend on the current moment of the execution of the process. FIG. 3 shows a table of variables used in the above pseudo-code process with explanatory comments. WORDs are e.g. one byte, 16-bits, 32-bits, 64-bits or 128-bits in length, depending on the usage.

For understanding of this process, consider a simple example. In the table of correspondence TC of FIG. 2, f_{10, 0, 0} stands for the situation that the algorithm has to perform an addition of DataInsVault[0] and DataInsVault[1], then store the result in DataInsVault[0], and increment the index.

To summarize, one value is updated or otherwise modified in the storage table DataInsVault for each operation. Moreover, this value is used to define an entry point to the table of correspondence TC, in turn used to define the involved operations and the involved data in the storage table DataInsVault. This means the code is self modifying all along its execution, hence this is a polymorphic hash function.

The last operation of the process is the message extraction. This operation defines the way one recovers the hash value (digest) from the data entries in the storage table DataInsVault. The simplest way is to extract (or read) k-bytes from the end to the beginning of the storage table. Other methods are possible such as picking bytes from the storage table in some given (predetermined) positions. This exemplary extraction operation is conventional and not restricting.

There are many possible variants of the above hash process. First, one can modify the way the message is introduced into (stored in) the storage table DataInsVault. In the above example, the message is logically XORed repeatedly into the storage table, but it is possible instead to add it to the storage table initial values, or to logically XOR it on a single location in the storage table; there are many possible combinations. Second, correspondence table TC may be too long to be put in a code; thus, instead of directly putting correspondence table TC into a full table, one can include a switch of case, such as: if opcodes=1 mod 257, this operation is an addition, else if opcodes=2 mod 257, this operation is a logical XOR. Third, one may consider also that the correspondence table TC contains some cases where the number k is either incremented or decremented. Then, the number of instructions performed in the hash function would depend on the data, which is good from a security point of view. There are other possible variants.

As one can see, the storage table DataInsVault is used to store both instructions (this is where one finds the computer code instructions to execute) and data (where one finds the data, and where one stores the result).

It is complicated to control the behavior of this hash process, since the associated computer program is in fact dynamically modifying itself. Thus from a security point of view, advantageously any analysis is complex. Because of the relative implementation simplicity of the process, but also because of its flexibility, the process can be used to harden message security against an attacker. Indeed, one can use a very large number of instructions (which is simply to code the different meanings of all the instructions); one can also modify the opcodes during the different steps, that is one can change the correspondence between opcodes and instruction during program execution. The large variety of usable instruction is a good way to harden against attackers.

In terms of variants, there may be a large variety of possible operations described in the correspondence table TC. Further, the message data as stored in the storage table can be partitioned into various lengths as bytes, 16-bits, words etc. This has an influence on the correspondence table TC, which can be in some cases reduced (by not involving all the possible entries). One can also use a set of tables of correspondence TC according to the values of the index j in the procedure describing the solution.

Finally, the number of rounds (iterations) defined by the values SEC_PARAM and the DATA_INS_VAULT_SIZE are selected to be large enough for the desired security level. From a security point of view, for this polymorphic hash function its process (the way the hash function is computed) depends (after a given time) on the input data. This hardens against an attack on this hash function.

Figure 4:
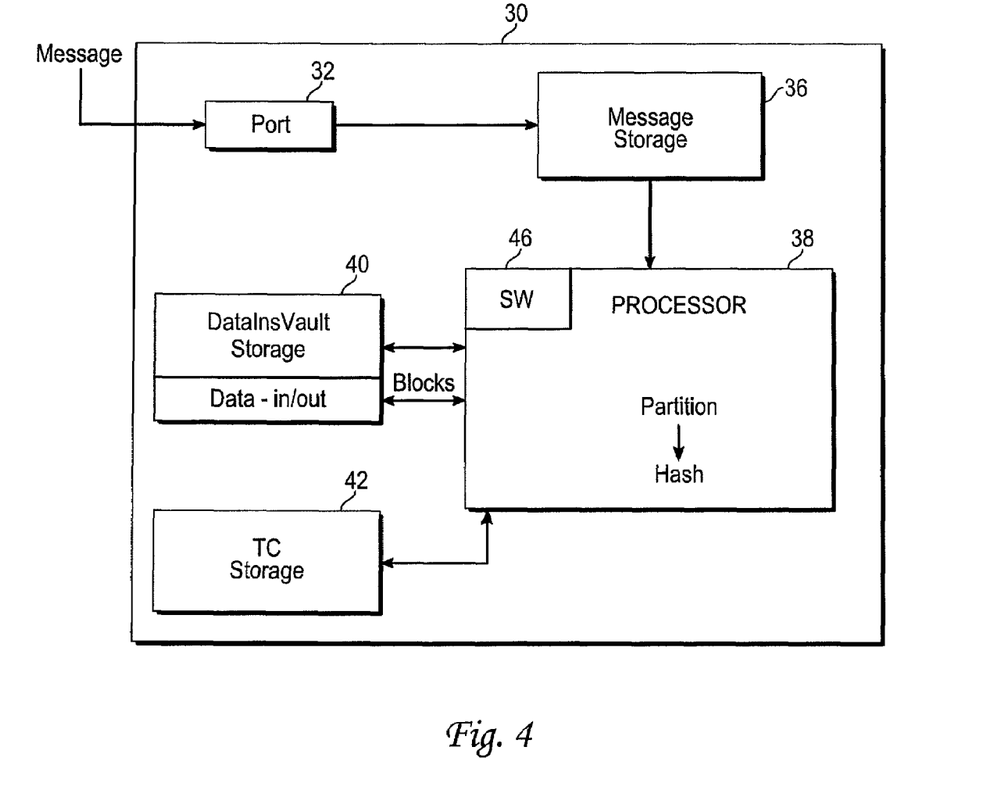
FIG. 4 shows a computing device in accordance with the invention.

FIG. 4 shows relevant portions of a computing device or system 30 configured in accordance with the invention and on which the present process may be performed. This may be a computer, mobile telephone, "Smart Phone", personal digital assistant, or other device or portion of such a device. This is not limiting. Moreover, each individual component is conventional in terms of hardware. While the above description of this process is in terms of computer software, this may be firmware, an application program, or logic embodied in hardware in the context of the FIG. 4 apparatus. Moreover the above description is of computing a hash function digest of an input message; the remaining conventional elements of use of the hash function, which are comparing the computed hash function to some other value associated with the message to authenticate the message are not illustrated.

In FIG. 4, computing device 30 has input port 32 for receiving (digital) message M from an external source (such as e.g. via the Internet from another computing device). Message M is then stored in conventional computer readable storage 36 (memory such as RAM, ROM, or a hard disc). Message M then is accessed by conventional processor 38 which is programmed to partition the message M into parts (blocks) of some convenient predetermined length and stores these blocks in a portion of the storage table DataInsVault 40 which (in hardware terms) may be the same physical memory device as storage 36. Processor 38 also stores correspondence table TC in storage 42, which again may be the same physical device as storage 36. Processor 38 (executing the above-described computer code which stored in associated computer readable software memory 46) performs computation of the hash function as explained above and may also conventionally verify the message using the resulting digest.

It is to be understood that the computer software described here is coded in any suitable computer language such as C or C++. Typically this computer software is executed by the processor of FIG. 4. Coding such software in light of this disclosure would be routine. The computer software itself as explained above is typically stored on a computer storage medium which is part of or coupled to the processor in the form of computer storage such as a disk drive, tape drive or semiconductor type memory as shown in FIG. 4. Typically this computer code is stored in the form of object code, which is compiled code, although it may be source code.

Figure 5:
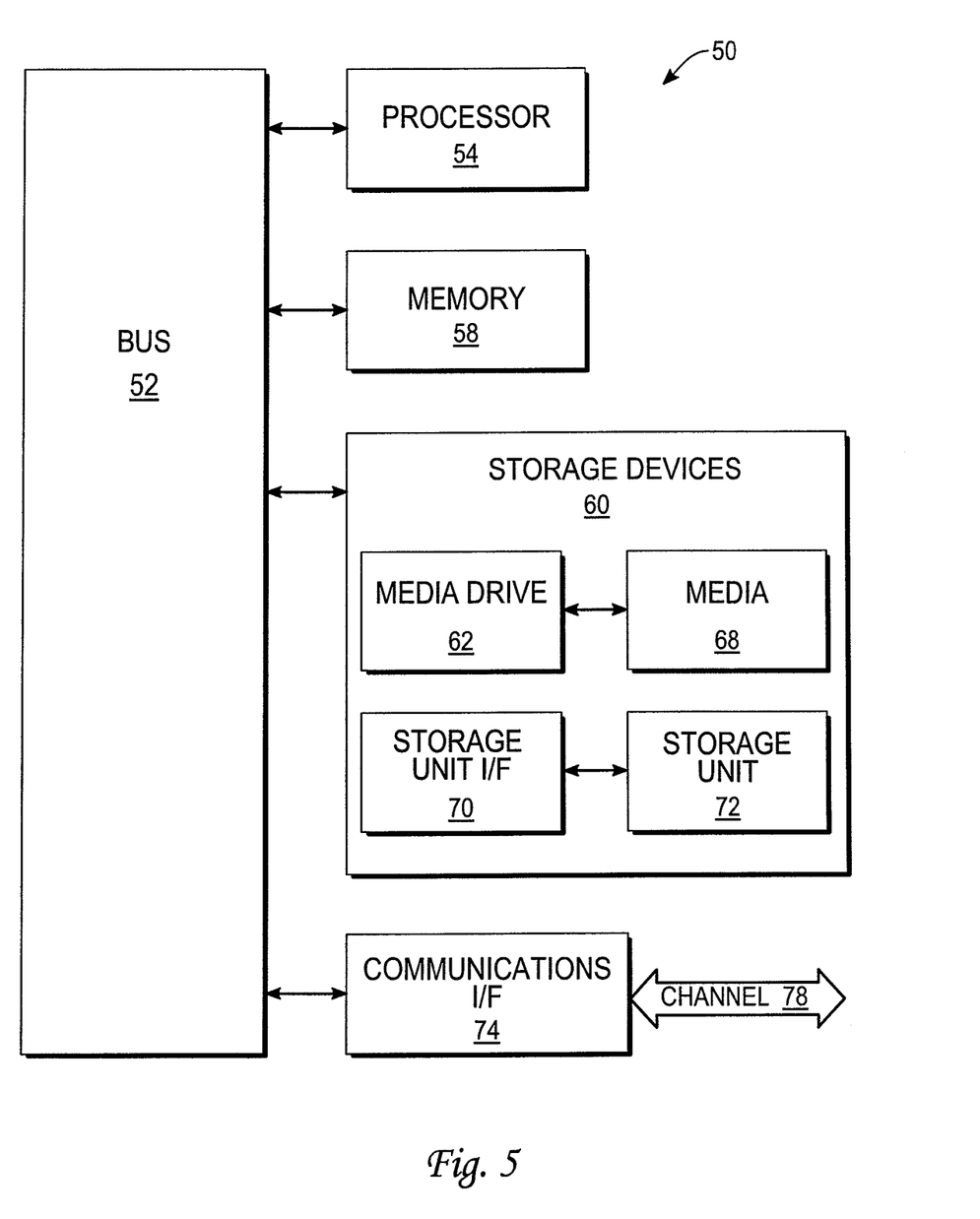
FIG. 5 shows further detail of the FIG. 4 computing device.

FIG. 5 illustrates a typical and conventional computing system 50 that may be employed to implement processing functionality in embodiments of the invention and shows additional detail of the FIG. 4 system. Computing systems of this type may be used in a computer server or user (client) computer or other computing device, for example. Those skilled in the relevant art will also recognize how to implement embodiments of the invention using other computer systems or architectures. Computing system 50 may represent, for example, a desktop, laptop or notebook computer, hand-held computing device (personal digital assistant (PDA), cell phone, palmtop, etc.), mainframe, server, client, or any other type of special or general purpose computing device as may be desirable or appropriate for a given application or environment. Computing system 50 can include one or more processors, such as a processor 54 (equivalent to processor 38 in FIG. 4). Processor 54 can be implemented using a general or special purpose processing engine such as, for example, a microprocessor, microcontroller or other control logic. In this example, processor 54 is connected to a bus 52 or other communications medium.

Computing system 50 can also include a main memory 58 (equivalent to memories 36, 46, 40 and 42), such as random access memory (RAM) or other dynamic memory, for storing information and instructions to be executed by processor 54. Main memory 58 also may be used for storing temporary variables or other intermediate information during execution of instructions to be executed by processor 54. Computing system 50 may likewise include a read only memory (ROM) or other static storage device coupled to bus 52 for storing static information and instructions for processor 54.

The computing system 50 may also include information storage system 60, which may include, for example, a media drive 62 and a removable storage interface 70. The media drive 62 may include a drive or other mechanism to support fixed or removable storage media, such as a hard disk drive, a floppy disk drive, a magnetic tape drive, an optical disk drive, a compact disk (CD) or digital versatile disk (DVD) drive (R or RW), flash memory or other semiconductor based storage or other removable or fixed media drive. Storage media 68 may include, for example, a hard disk, floppy disk, magnetic tape, optical disk, CD or DVD, flash memory or other semiconductor based storage or other fixed or removable medium that is read by and written to by media drive 64. As these examples illustrate, the storage media 68 may include a computer-readable storage medium having stored therein particular computer software or data.

In alternative embodiments, information storage system 60 may include other similar components for allowing computer programs or other instructions or data to be loaded into computing system 50. Such components may include, for example, a removable storage unit 72 and an interface 70, such as a program cartridge and cartridge interface, a removable memory (for example, a flash memory or other removable memory module) and memory slot, and other removable storage units 72 and interfaces 70 that allow software and data to be transferred from the removable storage unit 68 to computing system 50.

Computing system 50 can also include a communications interface 74 (equivalent to port 32 in FIG. 4). Communications interface 74 can be used to allow software and data to be transferred between computing system 50 and external devices. Examples of communications interface 74 can include a modem, a network interface (such as an Ethernet or other network interface card (NIC)), a communications port (such as for example, a USB port), a PCMCIA slot and card, etc. Software and data transferred via communications interface 74 are in the form of signals which can be electronic, electromagnetic, optical or other signals capable of being received by communications interface 74. These signals are provided to communications interface 74 via a channel 78. This channel 78 may carry signals and may be implemented using a wireless medium, wire or cable, fiber optics, or other communications medium. Some examples of a channel include a phone line, a cellular phone link, an RF link, a network interface, a local or wide area network, and other communications channels.

In this disclosure, the terms "computer program product," "computer-readable medium" and the like may be used generally to refer to media such as, for example, memory 58, storage device 68, or storage unit 72. These and other forms of computer-readable media may store one or more instructions for use by processor 54, to cause the processor to perform specified operations. Such instructions, generally referred to as "computer program code" (which may be grouped in the form of computer programs or other groupings), when executed, enable the computing system 50 to perform functions of embodiments of the invention. Note that the code may directly cause the processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system 50 using, for example, removable storage drive 64, drive 62 or communications interface 74. The control logic (in this example, software instructions or computer program code), when executed by the processor 54, causes the processor 54 to perform the functions of embodiments of the invention as described herein.

This disclosure is illustrative but not limiting; further modifications will be apparent to those skilled in the art in light of this disclosure and are intended to fall within the scope of the appended claims.

We claim:

1. A hashing method comprising the acts of:
   receiving a message at a port of a computing apparatus;
   storing the message in a first computer readable storage medium coupled to the port;
   partitioning the stored message into data blocks by a processor coupled to the first storage medium;
   entering one of the data blocks into a storage table held in a second computer readable storage medium coupled to the processor, the storage table having a plurality of entries each including a portion of the data block and an associated storage table index;
   providing a table of correspondence having a plurality of entries, each entry including one of the indices of the storage table, an index of the table of correspondence, and a computer instruction;
   selecting a current entry from the storage table;
   locating an entry in the table of correspondence using the entry from the storage table, including the portion of the data block, as an address;
   executing the computer instruction found in the located entry in the table of correspondence;
   storing a result of the execution of the computer instruction in the current entry in the storage table;
   repeating the selecting, locating, executing and storing the result, for a next value of the storage table index; and
   extracting a hash digest from the storage table entries.

2. The method of claim 1, further comprising the acts of:
   comparing the hash digest with a hash value associated with the message; and
   authenticating the message if the comparison results in a match.

3. The method of claim 1, wherein at least one of the computer instructions in the table of correspondence has no arguments, at least one has one argument, and at least one has two arguments, the arguments each being an entry in the storage table.

4. The method of claim 1, wherein each data block has a length of 1024 bytes, 512 bytes, 256 bytes, 2 bytes, or one byte of data.

5. The method of claim 1, wherein the storage table is initialized to a plurality of entries.

6. The method of claim 1, wherein the act of entering includes:
   initializing the storage table;
   applying a binary operation to the at least one of the data blocks and an initialized portion of the storage table; and
   storing a result of the binary operation in the initialized portion of the storage table.

7. The method of claim 1, further comprising the act of assigning a length of the storage table which is a predetermined number of entries.

8. The method of claim 1, further comprising the acts of:
   providing a security parameter; and
   applying the acts of selecting, locating, and executing a number of times defined by the security parameter.

9. A non-transitory computer readable medium carrying computer code to carry out the method of claim 1 on a computing device which includes the storage media, processor and port.

10. A computing apparatus programmed to carry out the method of claim 1.

11. Computing apparatus comprising:
    a port adapted to receive a message;
    a first computer readable storage medium coupled to the port and adapted to store the message;
    a processor coupled to the first storage medium and adapted to partition the message into data blocks; and
    a second computer readable storage medium coupled to the processor to store one of the data blocks in a storage table, the storage table having a plurality of entries each including a portion of the data block and an associated storage table index;
    the processor accessing a table of correspondence having a plurality of entries, each entry including one of the indices of the storage table, an index of the table of correspondence, and a computer instruction;
    the processor selecting a current entry from the storage table;
    the processor locating an entry in the table of correspondence using the entry from the storage table, including the portion of the data block, as an address;
    the processor executing the computer instruction found in the located entry in the table of correspondence;
    the processor storing a result of the execution of the computer instruction in the current entry in the storage table;
    the processor repeating the selecting locating executing and storing the result, for a next value of the storage table index; and
    the processor extracting a hash digest from the storage table.

12. The apparatus of claim 11, wherein the processor further:
    compares the hash digest with a hash value associated with the message; and
    authenticates the message if the comparison results in a match.

13. The apparatus of claim 11, wherein at least one of the computer instructions in the table of correspondence has no arguments, at least one has one argument, and at least one has two arguments, the arguments each being an entry in the storage table.

14. The apparatus of claim 11, wherein each data block has a length of 1024 bytes, 512 bytes, 256 bytes, 2 bytes, or one byte of data.

15. The apparatus of claim 11, wherein the storage table is initialized to a plurality of entries.

16. The apparatus of claim 11, wherein the processor further:

initializes the storage table;

applies a binary operation to the at least one of the data blocks and an initialized portion of the storage table; and     stores a result of the binary operation in the initialized portion of the storage table.

17. The apparatus of claim 11, wherein there is an assigned length of the storage table which is a predetermined number of entries.

18. The apparatus of claim 11, wherein there is a security parameter; and the processor applies the selecting, locating and executing a number of times defined by the security parameter.

* * * * *